May 9, 1961 G. B. SHIELDS 2,983,794
RECORDER-REPRODUCER APPARATUS
Filed June 23, 1954 5 Sheets-Sheet 1

INVENTOR.
George B. Shields
BY
Mason, Kolehmainen, Rathburn & Wyss
Attys:

May 9, 1961 G. B. SHIELDS 2,983,794
RECORDER-REPRODUCER APPARATUS
Filed June 23, 1954 5 Sheets-Sheet 2

INVENTOR.
George B. Shields
BY
Mason, Kolehmainen, Rathburn & Wyss
Attys.

May 9, 1961

G. B. SHIELDS 2,983,794

RECORDER-REPRODUCER APPARATUS

Filed June 23, 1954

INVENTOR.
George B. Shields
BY
Mason, Kolehmainen, Rathburn & Wyss
Attys.

May 9, 1961 G. B. SHIELDS 2,983,794
RECORDER-REPRODUCER APPARATUS
Filed June 23, 1954 5 Sheets-Sheet 5

INVENTOR.
George B. Shields
BY
Mason, Kolehmainen, Rathburn & Wyss
Attys.

United States Patent Office 2,983,794
Patented May 9, 1961

2,983,794

RECORDER-REPRODUCER APPARATUS

George B. Shields, Racine, Wis., assignor to Webster Electric Company, Racine, Wis., a corporation of Delaware Filed June 23, 1954, Ser. No. 438,655

28 Claims. (Cl. 179—100.2)

This invention relates to a recorder-reproducer apparatus utilizing an elongated record medium and, more particularly, to an apparatus of this type having new and improved means for moving and controlling the movement of an elongated medium such as magnetic tape or wire.

To insure high fidelity transducing operations with magnetic wires and tapes, it is necessary to move the record medium relative to a transducing head at a constant speed. This is generally accomplished by the use of a capstan-pinch roller type of drive in which the capstan is connected to a mechanical filter such as a flywheel which removes momentary variations in driving speed. It is also desirable to provide controllable means for moving the medium at different selected speeds and in various directions to permit the medium to be moved rapidly in a forward direction and to be quickly rewound on a supply reel.

However, these changes in the speed and the direction of the movement of the record medium cannot accurately and quickly be accomplished without the use of complicated linkages by using a control system which varies the position of the driving trains, sometimes including belt and pulley arrangements, because of the difficulty of accurately locating the axes of rotation of the various driven components and of preventing slipping of driving belts or pulleys. Also, these changes in speed and direction are not easily accomplished by shifting the motor means relative to the driving trains inasmuch as the deleterious effects of vibration inherent in movably mounting a vibrating body adjacent electronic components distorts the recording and the reproduction of sound.

Further, it is necessary to provide instantaneously operative controls over the movement of the tape during changes in speed and direction of movement thereby preventing overrunning of the medium, and over electrical connections to the transducing means associated with the medium in order to prevent the inadvertent loss of recorded information. This need for instantaneous control over the actual movement of the medium is particularly important when a transducing operation is to be interrupted to permit editing of a recorded track.

Accordingly, one object of this invention is to provide new and improved means for moving an elongated record medium between spaced reels.

Another object of this invention is the provision of new and improved means of controlling the actual movement of the record medium.

Another object is to provide improved independently controllable means for changing the speed at which an elongated record medium is moved.

A still further object involves the provision of improved means for interlocking the speed and direction controlling means with other independent means controlling the nature of the transducing operations to be performed.

Another object is to provide independently operable auxiliary control means for controlling the movement of the tape, which auxiliary means are operable during all types of movement thereof.

Another object is to provide recorder-reproducer apparatus in which the control over the speed and the direction of the movement of an elongated record medium is accomplished solely by moving reel supporting means relative to the driving means.

In accordance with these and many other objects, an embodiment of the present invention comprises a recorder-reproducer apparatus including a frame upon which is mounted a transducing head assembly operable either for recording signals on or reproducing signals from an elongated record medium moved adjacent the head assembly. A pair of rotatable reel supporting means are movably mounted on the base to receive a tape supply reel and a tape take-up reel, and these supporting means are selectively driven by a plurality of axially spaced driving pulleys of the same or different diameters mounted for rotation about a single fixed axis. In order to drive the tape in a forward direction during either recording or reproducing operations, a flywheel provided with a capstan is mounted on the base for rotation about a fixed axis, the capstan extending upwardly adjacent to the transducing means. A pinch roller movably mounted on the base is moved into engagement with the capstan to drive the tape in a forward direction.

In order to provide speed changing means, a pair of vertically spaced idlers are pivotally mounted on the base so as to selectively be moved into engagement with the flywheel and one of the driving pulleys, the engagement of a driving pulley of a particular diameter determining the speed at which the tape is moved. A main control means movably mounted on the base controls the position of the pinch roller relative to the drive capstan and the positions of the supporting means relative to both the driving pulleys and the flywheel thereby to selectively change the direction and speed at which the tape is moved between the two reels.

The apparatus includes an interlock controlled by the main control means which maintains a record-reproduce switch in selected positions to prevent the inadvertent loss of recorded information and also includes first and second braking means, both of which are rendered effective in response to movement of the reel supporting means under the control of the main control means and the second of which is rendered effective by manual operation in any position of the main control means.

Other objects and advantages of the present invention will become apparent from the following description of an illustrative embodiment thereof, in the course of which reference is made to the accompanying drawings in which:

Fig. 8 is a fragmentary cross sectional view similar to Fig. 7 showing the apparatus in a low speed, forward position;

Fig. 9 is a fragmentary cross sectional view similar to

Fig. 7 showing the apparatus conditioned for fast forward movement at a high speed.

Figure 1:
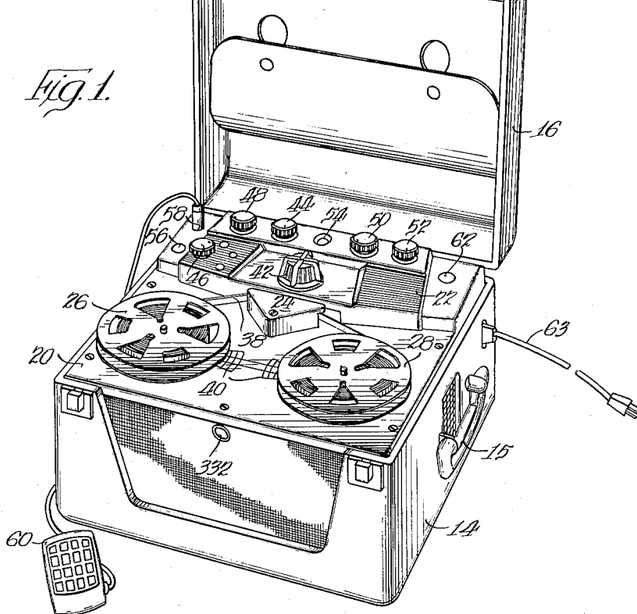
Fig. 1 is a perspective view of the recorder-reproducer apparatus.
Figure 2:
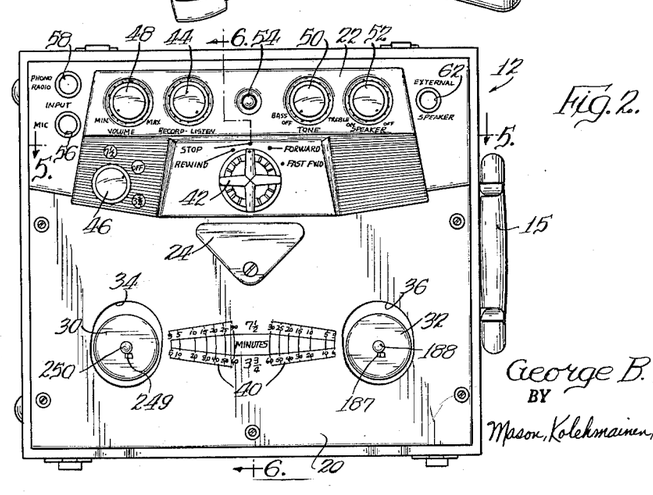
Fig. 2 is a top plan view of the apparatus shown in Fig. 1 with the cover and the tape reels removed.

Referring now to Figs. 1 and 2 of the drawings, a recorder-reproducer apparatus indicated generally as 12 includes a cabinet 14 having a handle 15 and a cover 16 pivotally and detachably secured thereto. The cover 16 includes a pocket 18 formed of flexible material for storing reels of magnetic tape and other auxiliary equipment used with the apparatus 12. The cabinet 14 comprises a supporting frame or base on which is mounted a faceplate 20, a removable escutcheon 22, and a transducer head cover plate 24 partially enclosing a transducing head assembly 64 (Figs. 3 and 4) which is electrically connected to conventional amplifier and oscillator circuits mounted within the cabinet.

A tape supply reel 26 and a tape take-up reel 28 are mounted on a pair of movably mounted rotatable cup-shaped supporting members 30 and 32, respectively, which are positioned within oblong openings 34 and 36 in the faceplate 20 to permit shifting movement of these reels. When the apparatus 12 is used, magnetic tape 38 on the supply reel 26 is passed over the transducing head assembly 64 and is secured to the take-up reel 28. The number of minutes of playing or recording time remaining on the reels 26 and 28 can be determined at any instant by comparing the amount of tape remaining on a given reel with indicia 40 printed on the faceplate 20, the indicia being calibrated in two parallel columns to provide an indication of time for tape movement at either a high speed of seven and one half inches per second or at a low speed of three and three quarter inches per second.

Figure 5:
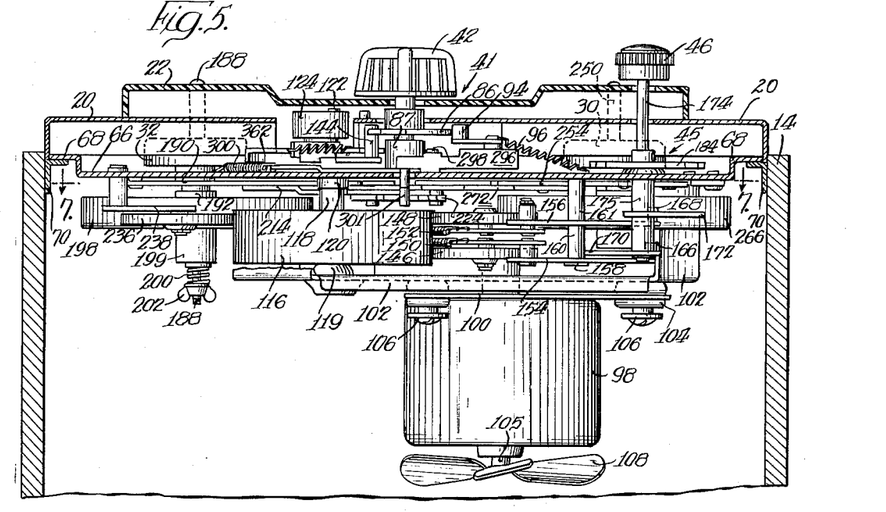
Fig. 5 is a fragmentary cross sectional view taken along line 5—5 in Fig. 2.
Figure 6:
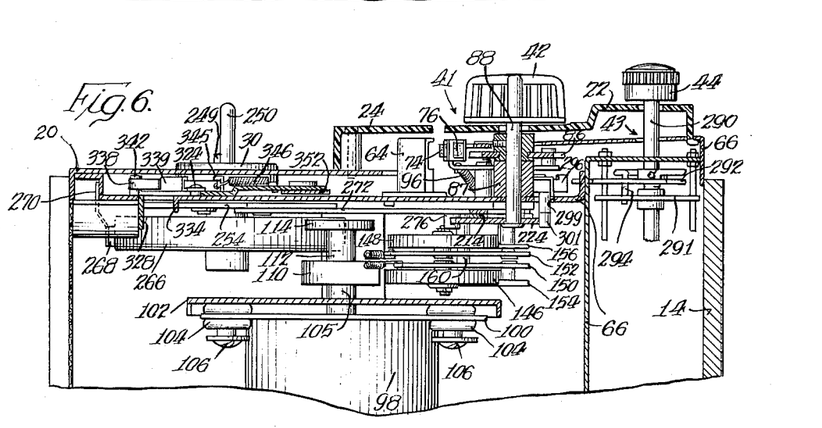
Fig. 6 is a fragmentary cross sectional view taken along line 6—6 in Fig. 2.

The direction and speed of movement of the magnetic tape 38 between the reels 26 and 28 is selected by a main control assembly 41 (Figs. 5 and 6) actuated by a main control knob 42. This knob has the four following control positions: a rewind position in which the tape 38 is returned from the take-up reel 28 to the supply reel 26 at a high speed, a stop position in which the tape moving means are rendered inoperative and the supporting means 30 and 32 are braked, a forward position in which the tape 38 is moved by a capstan type of drive from the supply reel 26 to the take-up reel 28 to permit either recording or reproducing operations, and a fast forward position in which the tape 38 is rapidly advanced from the supply reel 26 to the take-up reel 28 without the transducing head assembly 64 being rendered effective. In order to accomplish these results, the main control assembly 41 controls the effectiveness of means for braking rotation of the reels 26 and 28, the relative position thereof which determines the rotation thereof, the effectiveness of the capstan drive, and indirectly, the electrical connection to the transducing head assembly 64.

A recorder-reproduce or record-listen control assembly 43 (Figs. 3 and 6) which is actuated by a knob 44 conditions the transducing head assembly 64 for either a recording or a reproducing operation and is interlocked with the main control assembly 41 to permit the knob 44 to be retained in a record position after release only when the main control assembly 41 is in either a forward or a stop position. This interlock prevents the inadvertent erasing of recorded information when the tape 38 is rewound or advanced by fast forward movement since the erasing portion of the assembly 64 is only energized in the record position. As noted, the interlock also retains knob 44 in record position in the stop position of the main control. This enables the apparatus to be used as a public address system in the stop position because the speaker, which is used as a monitor during normal recording, is connected to the output of an amplifier section while the microphone 60 is connected to the input. In other words, the microphone is connected to the speaker through amplifier means when the record-reproduce control 43 is in the record position and the main control 41 is in the stop position although no tape movement takes place as when the main control is in positions other than the stop position.

A speed changing unit 45 (Figs. 5 and 7), which is operated by a knob 46, includes high speed and low speed positions in addition to an off position in which the driving means for the tape 38 are rendered ineffective. As shown in Fig. 2 of the drawings, an index mark on the knob 46 cooperates with indicia on the escutcheon 22 to indicate that the tape 38 is being moved at a high speed of seven and one half inches per second or at a low speed of three and three quarter inches per second. The unit 45 also includes means for automatically electrically compensating the amplifier circuits for varying tape speeds.

Knobs 48, 50, and 52 operate volume control means, on-off and tone control means, and the electrical connections to a loud speaker in the cabinet 14, respectively. A glow lamp 54 is provided to indicate the level of the amplifier output, and a pair of plug jacks 56 and 58 provide means for interconnecting the recorder-reproducer apparatus 12 with either a microphone 60 or a phonograph-radio input, respectively. An additional plug jack 62 is provided for interconnecting the apparatus 12 with an external loud speaker (not shown), and a detachable line cord 63 interconnects the apparatus 12 with a source of power.

The electrical components and all of the driving and driving control mechanisms, such as the assemblies 41, 43, and 45, are mounted on a frame 66 which is detachably secured to the cabinet 14. The frame 66 includes a plurality of integral offset flanges 68 which rest on angle brackets 70 secured to the walls of the cabinet 14 thereby permitting the operating mechanism of the apparatus 12 to be easily removed from the cabinet 14 by merely lifting the frame 66.

The transducing head 64 (Figs. 3 and 4), which is secured to the frame 66, includes both a record-reproduce head and an erase head which are selectively energized and conditioned for operation under the control of the assembly 43. A pair of tape guiding means 72 forming U-shaped channels are mounted on the frame 66 at either side of the transducing head assembly 64 to insure that the tape 38 passes over the gaps of the transducing heads in proper alignment.

To provide means for holding the magnetic tape 38 in engagement with the heads in the forward position in which the transducing operations are performed, a pair of pressure pads 74 and 76 are mounted on one end of a pair of arms 78 and 80, respectively. The other ends of the arms 78 and 80 are secured to a cam follower lever 82 which is pivotally mounted on a stud shaft 84 secured to the frame 66.

In order to provide manually operable means for moving the pressure pads 74, 76 into engagement with the tape 38 in the forward position and for holding these pads out of engagement therewith in all other operative positions of the apparatus 12, a control cam 86, including a low portion 90 and two high portions 92 and 95, is provided. This cam forms a part of the main control assembly 41 and is secured to a shaft 88 which is rotatably mounted on the frame 66 by a sleeve bearing 87. The main control knob 42 is secured to the upper end of the shaft 88. The outer edge of the cam 86 is engaged by a cam follower pin 94 secured to the lever 82 which is urged toward the cam by a tension spring 96 interconnecting the frame 66 with the lever 82. When the control cam 86 is rotated to the forward position shown in Fig. 4 of the drawings, the pin 94 engages the low portion 90 so that the lever 82 is pivoted in a clockwise direction by the spring 96 to move the pressure pads 74 and 76 into engagement with the tape 38 thereby pressing the tape against the transducing head assembly 64. When the control cam 86 is moved in a clockwise position from that shown in Fig. 4 to the fast forward position, the high portion 95 rotates the lever 82 in a counterclockwise direction to move the pressure pads 74 and 76 out of engagement with the tape 38. In a like manner, rotation of the cam 86 in a counterclockwise direction, from the position shown in Fig. 4 to either the stop position (Fig. 3) or the rewind position, moves the pin 94 into engagement with the high portion 92 to hold the pressure pads 74 and 76 out of engagement with the tape 38.

The prime mover for the apparatus 12 is provided by an electric motor 98 (Figs. 5 and 6) which is secured to a plate 100. In order to prevent the transmission of vibrations to the apparatus 12, the plate 100 is mounted on a supporting bracket 102 secured to the frame 66 by a plurality of screws 106 having resilient sleeves 104 interposed between the plate 100 and the screws. The lower end of a shaft 105 of the motor 98 is provided with a fan blade 108 which creates currents of air for cooling the motor 98 and the electronic components located within the cabinet 14.

The upper end of the motor shaft is provided with three axially spaced driving pulleys 110, 112, and 114, the large diameter pulley 110 providing means for driving the tape 38 at the high forward speed of seven and one half inches per second and the smaller diameter driving pulley 112 driving the tape 38 at the low forward speed of three and three quarter inches per second. The driving pulley 114, which is formed of rubber, is operative in the rewind position to return the tape 38 to the supply spool 26.

To insure constant speed movement of the tape 38 during recording or reproducing operations, a flywheel 116 secured to a shaft 118 and indirectly driven by the pulleys 110 and 112 is provided. The lower end of this shaft is rotatably journalled in a thrust bearing 119 (Fig. 5) mounted on the bracket 102 and an intermediate portion of the shaft 118 is rotatably mounted in a bearing 120 (Figs. 3 and 5) carried by the frame 66. The upper end of the shaft 118 is reduced in diameter to provide a drive capstan 122.

In order to render the drive capstan 122 effective to advance the tape 38 in the forward position of the main control assembly 41, the tape 38 is pressed into engagement with the outer periphery of the capstan 122 by a pinch roller 124. The roller 124 is rotatably mounted on a lever 126, one end of which is provided with an integral upstanding sleeve 128 within which is rotatably received a stud 130 secured to the frame 66. A second pinch roller control lever 132 is also rotatably mounted on the stud 130 between the upper surface of the frame 66 and the lever 126. The lever 132 is provided with an upstanding flange 134 to which is secured one end of a tension spring 136, the other end of which is secured to a projecting arm 138 on the lever 126. The spring 136 holds the arm 138 in engagement with a stop 134a formed integral with the flange 134. In this manner, the two levers 126 and 132 are interconnected for movement either together or relative to each other.

In order to move the pinch roller 124 into engagement with the capstan 122 and the tape 38 in the forward position of the control assembly 41, the control cam 86, forming a part thereof, is provided with a protuberance 140. A tension spring 142, which interconnects the frame 66 with the lever 132, urges a cam follower pin 144 on the lever 132 into engagement with the outer periphery of the cam 86 so that the positions of the lever 126 and 132 are controlled by the position of the cam 86.

When the knob 42 is rotated in a clockwise direction from the stop position (Fig. 3) to the forward position (Fig. 4), the protuberance 140 rotates the lever 132 in a clockwise direction. This clockwise movement of the lever 132 is transmitted to the lever 126 through the spring 136 to move the pinch roller 124 into engagement with the tape 38 and the capstan 122. In this position, rotation of the capstan 122 is effective to advance the magnetic tape 38 from the supply reel 26 to the take-up reel 28 at a rate determined by the speed at which the flywheel 116 and the capstan 122 are driven by the pulley 110 or 112. When the control cam 86 is in any position other than the forward position, the tension spring 142 holds the pin 144 in engagement with a low portion 145 on this cam to maintain the pinch roller 124 out of engagement with the tape 38 and the capstan 122.

The speed control unit 45, which drives the flywheel 116 at a high or a low speed, includes a pair of rubber tired idlers 146 and 148 (Figs. 5–10) which are selectively movable into driving engagement with the high speed pulley 110 and the low speed pulley 112, respectively. These idlers are rotatably supported on a pair of links 150 and 152, respectively, each having one end pivotally mounted on a pair of follower levers 154 and 156. The levers 154 and 156 are pivoted to the frame 66 by a shaft 158 which is rotatably received within spacing sleeves 160 and 161 formed integral with the levers 154 and 156, respectively. The free ends of the links 150 and 152 are interconnected with the bracket 102 by a pair of tension springs 162 and 164, respectively, which tend to rotate the levers 154 and 156 in a clockwise direction about the pivot formed by the shaft 158 so as to urge a pair of cam follower pins 166 and 168 secured to the free ends thereof into engagement with a pair of cams 170 and 172.

The cams 170 and 172 form a portion of the speed control unit 45 and are secured to a shaft 174 which is manually rotated by the speed control knob 46. The shaft 174 is rotatably mounted on the frame 66 by a bushing 175. The cam 170 controls the position of the high speed idler 146 and includes an off position depression 178 peripherally spaced from a stop position depression 176. The cam 172, which controls the position of the low speed idler 148, includes an off position depression 180 vertically aligned with the depression 178 and peripherally spaced from a stop depression 182.

Figure 9:
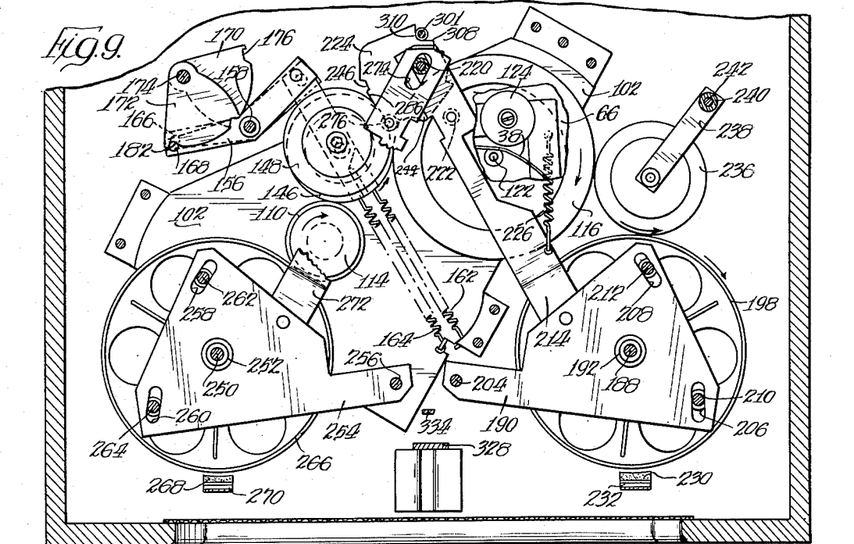

To operate the apparatus 12 at the high speed, the speed control knob 46 is rotated in a counterclockwise direction to move the cams 170 and 172 to the position shown in Fig. 9 of the drawings in which the pin 168 engages the depression 182 to prevent further counterclockwise rotation. During this rotation, the cam 170 is moved out of engagement with the pin 166 to permit the spring 162 to rotate the follower lever 154 in a clockwise direction, thereby urging the idler 146 into driving engagement with the outer periphery of the flywheel 116 and the outer periphery of the high speed driving pulley 110 to rotate the flywheel 116 and the capstan 122 at the high speed. Since the link 150 on which the idler 146 is mounted pivots freely with respect to the follower lever 154, the idler 146 is automatically moved into and held in driving engagement with both the flywheel 116 and the pulley 110.

The high speed drive is rendered ineffective by rotating the knob 46 in a clockwise direction to move the cam 170 into engagement with the pin 166, thereby pivoting the lever 154 in a counterclockwise direction to move the idler 146 out of engagement with the driving pulley 110 and the flywheel 116. This rotation is continued until such time as the pins 166 and 168 engage the aligned depressions 178 and 180 forming the off position of the speed control unit 45, in which position both of the idlers 146, 148 are held out of engagement with the driving pulleys 110, 112 and the flywheel 116.

Figure 7:
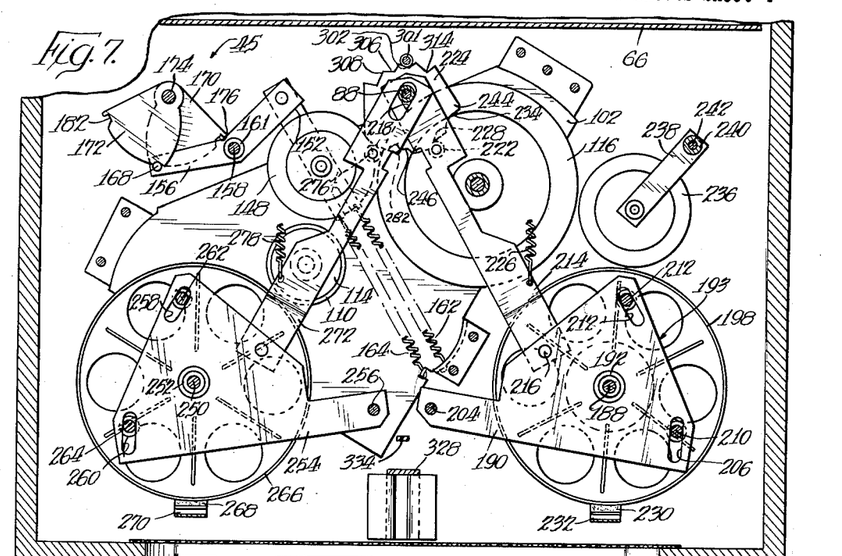
Fig. 7 is a fragmentary cross sectional view of the apparatus in a stop position taken along a plane indicated by line 7—7 in Fig. 5 but with the apparatus positioned as shown in Figs. 1 and 2, assuming that the entire structure is shown therein.

To operate the driving mechanism of the apparatus 12 at the low speed, the knob 46 and the shaft 174 are rotated in a counterclockwise direction from the position shown in Fig. 7 until the pin 166 engages the stop depression 176. During this movement, the pin 168 moves out of engagement with the cam 172 so that the follower lever 156 is pivoted in a clockwise direction by the spring 164. This moves the idler 148 into driving engagement with the outer peripheries of the low speed driving pulley 112 and the flywheel 116. The speed control unit 45 is returned to an off position by rotating the knob 46 in a counterclockwise direction to the position shown in Fig. 7 of the drawings in which the pins 166, 168 are received within the depressions 178, 180 and the lever 156 is rotated in a counterclockwise direction to withdraw the idler 148 from engagement with the driving pulley 112 and the flywheel 116.

Since the transducing head assembly 64 performs recording and reproducing operations in conjunction with tapes moving at different speeds, it is desirable to provide the amplifier circuit with means for compensating for these varying speeds. In order to automatically provide this compensation or equalization, the shaft 174 is provided with a cross arm 184 (Fig. 3), the ends of which are adapted to engage and move an operating member 186 for a conventional switch included in the amplifier circuits associated with the transducing head assembly 64.

Figure 3:
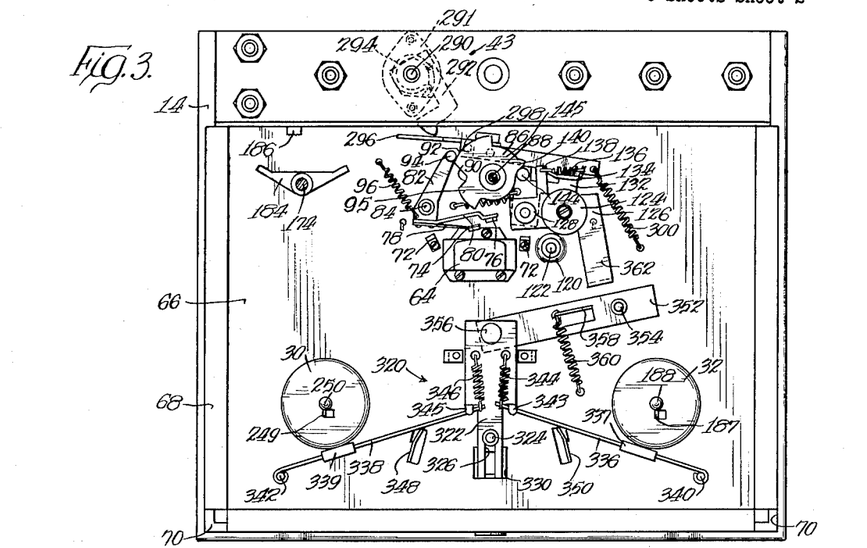
Fig. 3 is a top plan view of the apparatus shown in Fig. 2 with the faceplate removed and with the apparatus in a stop position.
Figure 4:
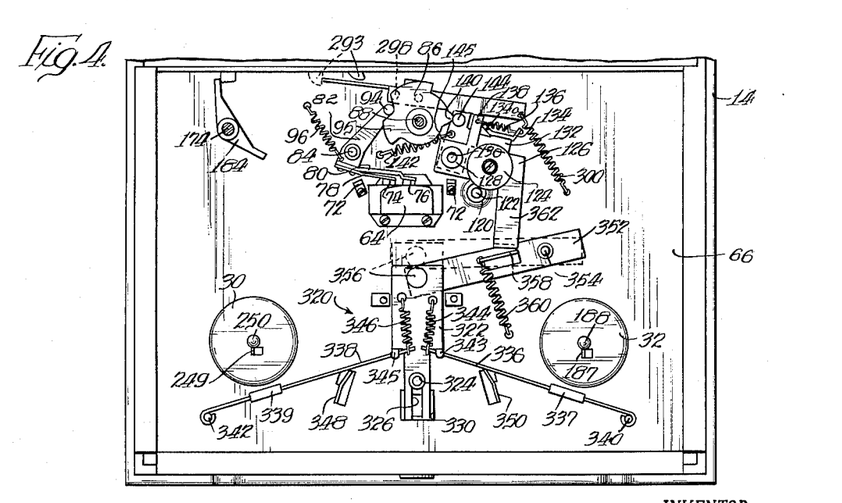
Fig. 4 is a top plan view of the apparatus shown in Fig. 3 with this apparatus conditioned for forward movement of the tape at a low speed.

When the shaft 174 is rotated in a clockwise direction from the position shown in Fig. 3 to that shown in Fig. 4, wherein the speed control unit 45 provides low speed tape movement, the switch operating member 186 is shifted to the right to adjust circuit components for low speed transducing operation. Conversely, when the shaft 174 is rotated in a counterclockwise direction from the position shown in Fig. 3 of the drawings to provide high speed tape movement, the switch operating member 186 is shifted to the left, as shown therein, to modify circuits for transducing operation with high speed tape. In this manner, the electrical circuits in the apparatus 12 are automatically equalized for different speed movements of the tape 38 in direct response to operation of the speed control unit 45.

Another feature characterizing the present invention is the provision of movable means for supporting the supply reel 26 and the take-up reel 28 so that variations in the speed and the direction of movement of the tape 38 can be accomplished solely by varying the positions of these reels. The take-up reel 28 is detachably mounted on the supporting member 32 by a shaft 188, which is slidably received within an aperture therein. An upstanding lug 187 (see Figs. 3 and 4) struck out of the member 32 engages a notch in the reel 28 to drivingly interconnect the reel and the member 32. The shaft 188 is rotatably mounted on a take-up reel shaft supporting plate 190 (Figs. 5 and 7) by means of a journal bearing 192 secured thereon.

To provide a friction clutch 193 for transmitting variable amounts of rotation to the shaft 188 and the reel 28, a metal disc 194 (Fig. 8) keyed to an intermediate portion of the shaft 188 by a pin 195 bears against a friction washer or pad 196 of a material such as felt which is cemented to a take-up reel pulley 198. The take-up reel pulley 198 is rotatably mounted on the shaft 188 by a journal bearing 199 (Fig. 5), and this pulley and the friction washer 196 carried thereon are urged axially towards the disc 194 by a coil spring 200 which is interposed between the bearing 199 and a thumb screw 202 mounted on the end of the shaft 188. Since the speed of the tape movement provided by the capstan 122 in the forward position is less than the speed at which the pulley 198 is rotated, the friction clutch 193, by means of slipping between the washer 196 and the disc 194, provides a means for maintaining tension on the tape 38 and for taking up the tape on the reel 28 at a rate determined by the capstan drive irrespective of the amount of tape on the reel 28.

In order to permit the take-up reel supporting means to be variably positioned relative to the frame 66, the supporting plate 190 is pivotally mounted to the frame 66 by a pin 204 which is rigidly secured to the frame 66. The plate 190 is also provided with two slots 206 and 208 within which are slidably received a pair of pins 210 and 212, respectively, for guiding and limiting the movement of the plate 190 relative to the frame 66.

The position of the plate 190 and consequently the position of the axis of rotation of the pulley 198 is changed by the main control assembly 41 which includes a reel plate arm 214 pivotally connected at one end to the plate 190 by a pivot pin 216. The other end of the arm 214 is provided with a slot 218 within which is slidably received an enlarged portion 220 of shaft 88 or a sleeve secured to the main control shaft 88, for guiding the movement of the arm 214. A roller 222 is rotatably mounted on an intermediate portion of the arm 214 and is urged, by a tension spring 226 which interconnects the frame 66 with the arm 214, into engagement with the outer periphery of a main control cam 224 secured to the shaft 88.

In the off or stop position shown in Fig. 7 of the drawings, the roller 222 engages a slight depression 228 on the cam 224 to hold the plate 190 in a position displaced clockwise about the axis provided by the pin 204. In this position, the outer periphery of the pulley 198 engages a pad 230 of frictional material fastened to a spring arm 232 which is mounted on the frame 66. The engagement of the pulley 198 with the braking material 230 prevents rotation of the take-up reel 28 in the off position and also prevents overrunning of the tape when the control means 41 is moved to the stop position from either the rewind or the forward position.

In Fig. 8 of the drawings, the knob 42 and control cam 224 are rotated slightly in a clockwise direction from the position shown in Fig. 7 to the forward position wherein the roller 222 engages a depression 234 in the cam 224. In this position, the plate 190 is rotated slightly in a counterclockwise direction so that the driving periphery of the pulley 198 is moved into engagement with a rubber tired idler 236 which is pivotally mounted on the frame 66 by a link 238 having an integral sleeve 240 within which is received a stud shaft 242 secured to the frame 66. The axis of rotation of the link 238 is such that when the pulley 198 moves into engagement therewith, this idler is also shifted into driving engagement with the outer periphery of the flywheel 116 thereby effectively coupling the take-up reel pulley 198 with the flywheel 116 which is rotated at a selected speed under the control of the speed control unit 45.

As set forth hereinabove in detail, in the forward position of the assembly 41, the pinch roller 124 engages the drive capstan 122 to advance the magnetic tape 38 at the speed determined by the control unit 45. The take-up reel pulley 198 is rotated by the flywheel 116 through the idler 236 at a greater rate of speed than that at which the tape is advanced by the capstan drive. However, the friction clutch 193 permits the take-up reel 28 to be rotated at only a fast enough rate to apply continuous tension to the tape 38 and to take up the tape advanced by the capstan drive.

To condition the apparatus 12 for fast forward movement, the cam 224 is rotated by the knob 42 in a clockwise direction from the position shown in Fig. 8 to that shown in Fig. 9 of the drawings. In moving to this position, the roller 222 engages a high portion 244 on the cam 224 to pivot the plate 190 in a clockwise direction thereby momentarily moving the driving periphery of the pulley 198 into light braking engagement with the pad 230 and out of driving engagement with the idler 236. This momentary braking of the take-up reel 28 prevents overrunning of the tape 38 and prevents the application of excessive force to the tape when changing from one type of drive to another which might cause tape breakage.

When the cam 224 is in the fast forward position, the roller 222 is not engaged and the tension spring 226 urges the pulley 198 into driving engagement with the idler 236, this idler thereby being moved into driving engagement with the outer periphery of the flywheel 116. By moving the roller 222 out of engagement with the cam 224, the full force of the spring 226 holds the flywheel 116, the idler 236, and the pulley 198 in intimate driving engagement. As explained hereinabove, in this position, the pinch roller 124 does not engage the drive capstan 122 and, accordingly, the take-up reel 28 is driven at the speed of the flywheel 116, there being no slipping in the clutch 193.

Figure 10:
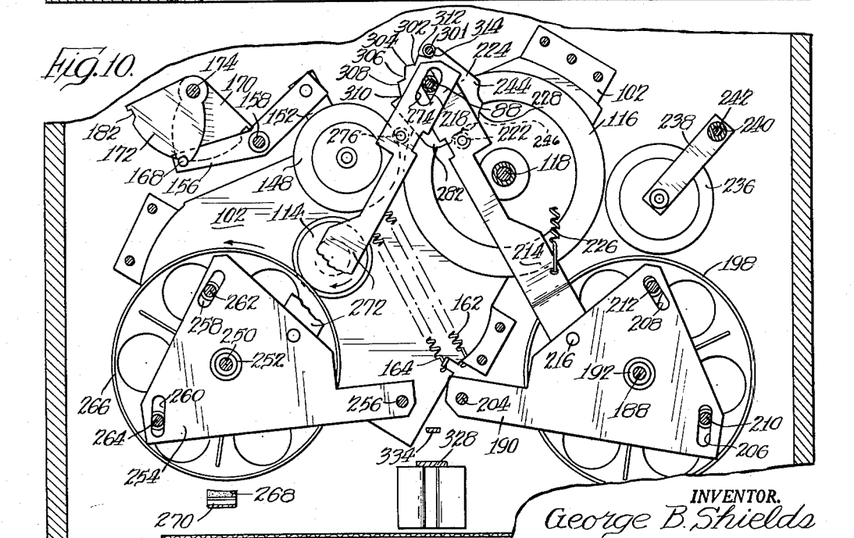
Fig. 10 is a fragmentary cross sectional view similar to Fig. 7 showing the apparatus conditioned for a rewinding operation.

When the assembly 41 is turned to the rewind position shown in Fig. 10, the roller 222 engages a slight depression 246 on the cam 224 thereby holding the plate 190 in a clockwise deflected position in which the driving periphery of the pulley 198 is held out of engagement with the friction pad 230. Also, in moving either toward or from the rewind position, the roller 222 engages a raised cam surface 286 separating the depressions 228 and 246 so that the periphery of the pulley 198 is pressed into firm engagement with the friction pad 230, thereby to apply a heavy braking force to the pulley 198 for preventing overrunning of the tape 38.

Referring now to the supply reel 26, this reel is movably mounted on the frame 66 to be shifted in position by the main control assembly 41 so that it can be driven in the rewind position to return the tape 38 from the take-up reel 28. More particularly, the plate 30 having an upstanding lug 249 for driving the supply reel 26 is secured to a shaft 250, an intermediate portion of which is rotatably received within a bearing 252 (Fig. 7) secured to a supply reel shaft supporting plate 254. The plate 254 is pivotally mounted to the frame 66 by a pivot pin 256 and also includes a pair of guide slots 258 and 260 within which are received guide pins 262 and 264, respectively.

The reel 26 is driven by a supply reel driving pulley 266 which is secured to the lower end of the shaft 250. A supply reel brake is provided by a friction pad 268 which is secured to the frame 66 by a resilient arm 270.

The cam 224 of the main control assembly 41 adjusts the position of the supply reel supporting plate 254 in synchronism with the controlled movements of the take-up reel supporting plate 190. The linkage by which this is accomplished includes an arm 272 which is pivotally secured at one end to the plate 254 and at the other end is provided with a slot 274 within which is received the enlarged portion 220. A cam follower roller 276 rotatably mounted on an intermeidate portion of the arm 272 is urged into engagement with the outer periphery of the cam 224 by a tension spring 278 (Fig. 7) which interconnects the arm 272 with the frame 66.

In the stop position shown in Fig. 7 of the drawings, the roller 276 engages a raised portion 282 on the cam 224. This raised portion pivots the plate 254 about the pivot pin 256 in a counterclockwise direction to move the outer periphery of the pulley 266 into engagement with the friction pad 268 thereby applying a braking force to this pulley in the stop position to prevent inertia induced rotation of the reel 26 and any accompanying overrunning of the tape 38.

When the cam 224 is rotated to the forward position shown in Fig. 8 of the drawings, the roller 276 moves into the depression 246 on the cam 224 so that the plate 254 is pivoted in a clockwise direction to move the outer periphery of the pulley 266 out of engagement with the friction pad 268, thereby permitting the magnetic tape 38 to be freely advanced from the supply reel 26 by the engaged pinch roller 124 and drive capstan 122.

When the control cam 224 is moved to the fast forward position shown in Fig. 9 of the drawings, the roller 276 moves out of the depression 246 and passes over a raised portion 286 on the cam 224 thereby moving the outer periphery of the pulley 266 into momentary engagement with the friction pad 268 to apply a heavy braking force. Continuing rotation of the cam 224 moves the roller 276 into engagement with the depression 228 thereby causing the plate 254 to be moved in a clockwise direction to move the pulley 266 out of engagement with the friction pad 268. Return movement of the cam 224 to the forward or the stop position causes the roller 276 to engage the raised portion 286 on the cam 224 and, accordingly, applies a momentary heavy braking force to the pulley 266.

Since the pulleys 198 and 266 are moved in synchronism by movement of the control cam 224 either toward or away from the fast forward position, the application of the heavy braking force to the supply pulley 266 and, as set forth hereinbefore, the application of a light braking force to the take-up pulley 198 both prevent overrunning and breakage of the tape 38. More particularly, the application of a heavy braking force to the supply pulley 266 prevents the rotary inertia of the supply reel 26 and its associated supporting and driving means from causing overrunning of the tape 38. The concurrent application of a light braking force to the pulley 198 reduces the rotary inertia of the take-up reel 28 and its associated supporting and driving means to avoid breaking the tape 38 when the supply reel is braked to prevent overrunning.

When the tape 38 is to be rewound from the take-up reel 28 to the supply reel 26, the pulley 266 is directly driven by the driving pulley 114. To accomplish this, the control cam 224 is rotated to the position shown in Fig. 10 in which the roller 276 does not engage this cam thereby permitting the tension spring 278 to urge the outer periphery of the pulley 266 into intimate driving engagement with the resilient driving pulley 114. The rewinding operation is terminated by returning the control cam 224 to the stop position shown in Fig. 7 in which the pulley 266 is moved into braking engagement with the friction pad 268.

In moving the cam 224 away from the rewind position, the roller 276 engages the raised portion 282 to apply a braking force to the pulley 266 at substantially the same time as the heavy braking force is applied to the take-up reel pulley 198, as set forth in detail hereinabove. The application of a braking force to the pulley 266 in conjunction with the braking of the pulley 198 prevents the tape 38 from being broken by the force of inertia of the supply reel 28 and its associated supporting and driving means when rotation of the take-up reel is sharply arrested.

Accordingly, the provision of rotatable supporting means movable relative to the frame 66 provides a mechanism in which a single control cam 224 varies the positions of the pulleys 266 and 198 relative to the driven components of the mechanism so that changes in the direction and the speed of the movement of the tape 38 can be easily accomplished without the necessity of changing the axis of rotation of any of the elements comprising the driving train.

To prevent the inadvertent loss of recorded information, an interlock is provided between the main control assembly 41 and the record-listen control assembly 43. The record-listen knob 44 is secured to a shaft 290 (Figs. 3 and 6) which is rotatably mounted on a disc 291 of a wafer switch which controls the electrical connections to the transducer head assembly 64. One end of a circular resilient member 294 is secured to the disc 291, and the other end extends through a slot in the disc 291 to be secured to an arm 293 mounted on the shaft 290. As shown in Fig. 3, the spring 294 biases the shaft 290 into the listen position in which the erasing means in the transducing head assembly 64 are not effective.

In order to lock the shaft 290 in a record position in which the erasing means are effective, an interlock arm 292 secured to the shaft 290 and a control lever 296 are provided. The lever 296 is pivoted to the frame 66 by a pin 298 and is interconnected with the frame 66 by a tension spring 300 which biases the lever in a clockwise direction.

The movements of the interlock lever 296 are coordinated with the movements of the pressure pads 74 and 76, the pinch roller 124, the supply reel 26, and the take-up reel 28 by means of the control cam 224. A roller 301 rotatably mounted on the interlock lever 296 extends downwardly through an opening 299 (Fig. 6) in the frame 66 and is held in engagement with the outer periphery of the cam 224 by the spring 300.

In the stop position shown in Figs. 3 and 7 of the drawings, the cam follower roller 301 engages a depression 302 in the cam 224 so that the lever 296 is pivoted in a clockwise direction to the position shown in Fig. 3. In this position, rotation of the shaft 290 in a clockwise direction to a record position moves a projecting end of the arm 292 into engagement with the free end of the lever 296 to pivot this lever in a counterclockwise direction about the pin 298 against the action of the spring 300. When the end of the arm 292 moves beyond the end of the lever 296, the spring 300 moves the end of the lever 296 into interlocking engagement with the end of the arm 292 thereby to maintain the transducing head assembly 64 in condition for a recording operation.

When the cam 224, is rotated in a clockwise direction toward the forward position shown in Fig. 8, the roller 301 passes over a raised portion 304 on the cam 224 to pivot the lever 296 in a counterclockwise direction to move the free end of the lever 296 out of engagement with the arm 292 thereby permitting the spring 294 to return the shaft 290 to a position in which the transducing head assembly 64 is conditioned for a reproducing operation.

Continuing clockwise rotation of the cam 224 moves the roller 301 into engagement with a depression 306 to pivot the lever 296 in a clockwise direction to the position shown in Fig. 4. In this position, the end of the lever 296 again can be engaged and pivoted by the end of the arm 292 to interlock the arm 292 and the lever 296, as shown in dashed outline to hold the control 43 in a record position.

Since recording operations are not performed when the control assembly 41 is in the fast forward position, rotation of the control cam 224 toward this position, as shown in Fig. 9, moves the roller 301 into engagement with a raised portion 308 to pivot the lever 296 in a counterclockwise direction thus releasing the interlocked arm 292 and lever 296 to permit the shaft 290 to be returned to a normal listen position under the control of the spring 294. Continuing rotation of the cam 224 into the fast forward position moves the roller 301 into engagement with a depression 310 in this cam to pivot the interlock lever 296 in a counterclockwise direction to a position in which engagement between the end of this lever and the arm 292 cannot be produced. This prevents the shaft 290 from being held in a record position in the fast forward position and, consequently, prevents energization of the erasing means in the transducing head assembly 64.

Also, it is necessary to prevent the transducing head assembly 64 from being conditioned for a recording operation in the rewind position of the apparatus 12 inasmuch as energization of the erasing head during rewinding of the tape would result in the loss of the intelligence recorded thereon. Accordingly, when the control cam 224 is rotated from the stop position shown in Fig. 7 to the rewind position shown in Fig. 10, the roller 301 initially engages a raised portion 312 which pivots the lever 296 in a counterclockwise direction to disengage this lever from the arm 292, thereby permitting the shaft 290 to be returned to the listen position. Continuing rotation of the cam 224 moves the roller 301 into a depression 314 so that the lever 296 is moved to and held in a clockwise rotated position in which the arm 292 cannot engage the lever 296, thereby preventing the erasing head from being maintained in an energized condition.

Accordingly, the interlock between the main control assembly 41 and the record-listen control means 43 is such that the control means 43 is automatically returned to its normal listen position in response to movement of the main control means 41 to any of its four positions, and, in addition, this interlock permits the record-listen control means 43 to be held in a record position in only the stop and forward positions of the main control assembly 41.

An auxiliary control means indicated generally as 320 (Figs. 3 and 4) is provided for stopping the movement of the supply reel 26 and the take-up reel 28 in any of the positions of the main control means 41 and, in only the forward position, for moving the pinch roller 124 out of engagement with the drive capstan 122 to terminate movement of the tape 38 thereby permitting the tape to be edited.

The braking means provided by the assembly 320 include two resilient brake pads 337 and 339 which are adapted to engage the depending annular side walls of the reel supporting means 32 and 30, respectively. These pads are mounted on a pair of levers 336 and 338 which are pivotally secured to the frame 66 by a pair of pivot pins 340 and 342, respectively. The free ends of the levers 336 and 338 are interconnected with an operating plate 322 by a pair of tension springs 344 and 346 which urge these ends toward a pair of integral upstanding lugs 343 and 345 on this plate. A pair of upstanding lugs 348 and 350 formed integral with the frame 66 provide stops for the levers 336 and 338.

The operating plate 322 is slidably mounted on the frame 66 by a pin 324 which is slidably received within a slot 326 in this plate. An end 328 (Fig. 7) of the plate 322 extends downwardly at right angles through an opening 330 in the frame 66 in alignment with an opening 332 (Fig. 1) in the cabinet 14 to permit the end 328 to be engaged and moved by suitable remote control means. A depending portion 334 formed integral with the frame 66 limits the inward movement of the plate 322.

The braking means provided by the assembly 320 in the normal position (Fig. 3) wherein the levers 336 and 338 engage the stops 350 and 348, brake the reels 26 and 28 by holding the pads 337 and 339 in engagement with the supporting means 32 and 30 simultaneously with the braking produced by the frictional engagement between the pulleys 198 and 266 and the friction pads 230 and 268. More particularly, when the main control assembly 41 is turned to the stop position, the movement of the plates 190 and 254 produces simultaneous frictional engagement between the supporting means 30, 32 and the pads 337, 339 and between the pulleys 198, 266 and friction pads 230, 268. Further, when the main control 41 is moved from the forward position to the fast forward position or vise versa, the braking means in the auxiliary control 320 are rendered momentarily effective to apply a light braking force to the supporting means 32 and a heavy braking force to the supporting means 30 in synchronism with the like effectiveness of the fixed brake pads 230 and 268. In the same manner, movement of the main control 41 toward and away from the rewind position causes the auxiliary control 320 to apply a heavy braking force to the supporting means 32 and a lighter braking force to the supporting means 30 in conjunction with like braking by the pads 230 and 268. Accordingly, the main brakes, provided by the pads 230 and 268, and the auxiliary brakes in the control 320 are rendered simultaneously effective to prevent both overrunning and breakage of the tape 38 by the selective application of braking forces during the adjustment of the main control 41 to different settings.

The auxiliary control 320 can also be operated by moving the operating plate 322 inwardly to retard or stop movement of the reels 26 and 28 in any of the tape moving positions of the main control 41. This movement of the plate 322 pivots the lever 338 in a counterclockwise direction and the lever 336 in a clockwise direction thereby pressing the pads 337 and 339 against the supporting means 32 and 30. The variable spacing between the supporting means 30, 32 and the pads 337, 339 in the different operative positions of the main control 41 is compensated for by the springs 344 and 346 which interconnect the levers with the operating plate 322 and permit relative movement therebetween thereby insuring that both of the pads are moved into braking engagement with the reel supporting means 30 and 32.

To stop movement of the tape 38 in the forward position, the auxiliary control 320, in addition to braking the reel supporting means 30 and 32, moves the pinch roller 124 out of driving engagement with the drive capstan 122. Therefore, the control means 320 includes a lever 352 which is pivotally connected to the frame 66 by a pin 354 and to the plate 322 by a pivot pin 356. A tension spring 360 interconnects an upstanding lug 358 on the lever 352 with the frame 66 for returning both the lever 352 and the plate 322 to their normal position.

The pinch roller control lever 126 is provided with a depending leg 362 which is moved into engagement with the lug 358 in the forward position. Accordingly, when the plate 322 is moved inwardly to the displaced position shown in dashed line in Fig. 4, the lever 352 rotates the lever 126 in a counterclockwise direction about the pin 130, thereby moving the pinch roller 124 out of engagement with the capstan 122 to terminate movement of the tape 38. Since the lever 126 is resiliently interconnected with the cam follower lever 132 by the spring 136, this counterclockwise rotation of the lever 126 does not move the lever 132 which is held in position by the raised portion 140 on the cam 86.

When the displacing force is removed from the end 328 of the lever 322, the spring 360 returns the assembly 320 to the position shown in Fig. 4 in which the friction pads 337 and 339 are moved out of engagement with the reel supporting means 30 and 32 and in which the lever 126 is pivoted in a clockwise direction by the spring 136 to move the pinch roller 124 into engagement with the drive capstan 122.

Accordingly, the auxiliary control means 320 can apply braking forces to the reel supporting means 30 and 32 in all of the positions of the main control assembly 41 and, in only the forward position thereof, also lifts the pinch roller 124 out of driving engagement with the drive capstan 122 to instantaneously terminate movement of the magnetic tape 38.

The control circuits for the motor 98 and the electronic circuits associated with the transducer head assembly 64 are of conventional design and are not disclosed.

In order to explain the operation of the apparatus 12, a summary of the positions of the more important elements thereof is set forth below:

threaded through the guide means 72 over the transducer head assembly 64 and between the drive capstan 122 and the pinch roller 124. The free end is then secured to the take-up reel 28 which is positioned on the supporting means 32. Thereafter, the knob 50 is rotated to energize the motor 98 and, if desired, the microphone 60 is connected with the amplifier circuits by inserting a plug in the microphone input jack 56.

If it is desired to operate the apparatus 12 at the high speed, the knob 46 is rotated in a counterclockwise direction to move the idler 146 into engagement with the outer periphery of the driving pulley 110 and the flywheel 116. Alternatively, if the apparatus is to be operated at low speed, the knob 46 is rotated in a clockwise direction from the off position to move the idler 148 into engagement with the driving peripheries of the pulley 112 and the flywheel 116. Simultaneously with moving the selected idler into engagement with a driving pulley, the arm 184 actuates the switch operating means 186 to compensate the electrical circuits for operation at either of the selected speeds.

In order to record on the tape 38, the main control knob 42 is rotated in a clockwise direction to the forward position to move the pressure pads 74 and 76 to press the magnetic tape 38 against the transducer head assembly 64, to move the pinch roller 124 into engagement with the drive capstan 122, to move the interlock lever 296 into a position effective to hold the record-listen control 43 in a recording position, to move the pulley 198 into engagement with the idler 236 and this idler into engagement with the flywheel 116, and to move the supply spool pulley 266 out of engagement with the friction pads 268 and 339 thereby freeing this pulley for rotation to permit the capstan drive to advance the tape 38 to the take-up spool 28. Simultaneously with operating the main control 41, the knob 44 is turned to the record position so that the arm 292 and the lever 296 engage and interlock to hold the control 43 in a record position. In response to these operations, the magnetic tape 38 is advanced from the supply reel 26 to the take-up reel 28 at a rate determined by the speed at which the capstan 122 is rotated, the take-up reel 28 being driven at a lower speed than the take-up reel pulley 198 because of the slipping in the clutch 193.

If it is desired to temporarily interrupt the recording operation, the auxiliary control assembly 320 is actuated by engaging and moving the plate 322 to lift the pinch roller 124 out of engagement with the capstan 122 and to simultaneously press the friction pads 337 and 339 against the supporting means 30 and 32. Release of the plate 322 reengages the pinch roller 124 with the capstan 122 and removes the braking forces applied to the sup-

*Position of main control assembly 41*

| Component | Rewind | Stop | Forward | Fast Forward |
|---|---|---|---|---|
| Pressure Pads | Off | Off | On | Off. |
| Pinch Roller | Off | Off | On | Off. |
| Take-up Reel | Free | Braked by fixed and auxiliary brakes. | Driven by flywheel through slipping clutch. | Driven by flywheel. |
| Supply Reel | Driven directly from motor | Braked by fixed and auxiliary brakes. | Free | Free. |
| Interlock | Off | Effective to permit monitoring or use as public address system. | Effective to permit recording | Off. |
| Fixed Brake | Off but is effective to apply a heavy braking force to the take-up reel and a lighter braking force to the supply reel going toward or away from this position. | On | Off but is effective on both reels going toward or away from this position. | Off but is effective to apply a heavy braking force to the supply reel and a light braking force to the take-up reel going toward or away from this position. |
| Auxiliary Control | Can brake both reels and is effective on both reels going toward or away from this position to apply a heavy braking force to the take-up reel and a lighter force to the supply reel. | Brakes both reels | Can brake both reels and move pinch roller out of engagement with capstan; is also effective to brake both reels when moving toward or away from this position. | Can brake both reels and is effective to apply a heavy braking force to the supply reel and a light braking force to the take-up reel going toward or away from this position. |

Before placing the apparatus 12 in operation, a supply reel 26 filled with magnetic tape 38 is placed on the reel supporting means 30, and the free end of the tape 38 is threaded porting means 30 and 32 to render the capstan drive effective to again advance the tape 38 to the take-up reel 28.

Following recording of the desired information, the control knob 42 is rotated in a counterclockwise direction to the rewind position to return the tape 38 now on the take-up spool 28 to the supply reel 26. In moving from the forward position toward the rewind position, the main control assembly 41 moves the pressure pads 74 and 76 out of engagement with the tape 38, lifts the pinch roller 124 out of engagement with the capstan, disengages the interlock lever 296 from the arm 292 to permit the knob 44 to return to a listen or reproduce position, moves the pulleys 198 and 266 into engagement with the friction pads 230 and 268, respectively, and moves the supporting means 30 and 32 into engagement with the friction pads 337 and 339, thereby stopping all movement of the tape 38. Thereafter, continuing movement of the control knob 42 into the rewind position moves the pulley 266 into driving engagement with the pulley 114 and out of engagement with the friction pad 268, moves the supporting means 30 out of engagement with the friction pad 339, moves the supporting means 32 out of engagement with the friction pad 337, and moves the pulley 198 out of engagement with the friction pad 230, thereby permitting the magnetic tape 38 to be freely removed from the take-up spool 28.

The previously recorded tape on the supply reel 26 is reproduced by returning the knob 42 to the forward position, the knob 44 remaining in its normal listen position to interconnect the transducing head assembly 64 with the amplifying circuits. The knob 52 is then turned to a position to interconnect the speaker with the amplifying network. As set forth hereinabove, movement of the knob 42 to the forward position causes movement of the magnetic tape from the supply reel 26 to the take-up reel 28 under the control of the capstan 122 at a speed determined by the position of the speed control unit 45.

The tape 38 may be rapidly advanced to locate the intelligence recorded on a remote section of the tape remaining on the supply reel 26 by turning the knob 42 to the fast forward position in which the pinch roller 124 is moved out of engagement with the drive capstan 122 so that the reel 26 is driven without slipping in the clutch 193 through the idler 236 and the pulley 198. In moving from the forward to the fast forward position, both the pulleys 198, 266 and the supporting means 30, 32 are moved into momentary engagement with the friction pads 230, 268 and 337, 339 to stop movement of the tape 38 and prevent overrunning.

Since the speed control is completely independent of the main control assembly 41, the knob 46 may be rotated to either the high or the low speed position independently of any movement of the main control knob 42 whenever it is desired to change the tape speed. The auxiliary control 320 may be rendered effective in any position of the main control assembly 41 and in any operative position of the speed control unit 45 to interrupt movement of the tape 38 without changing the positions of either of these control means.

While the invention has been described in conjunction with a recorder-reproducer, it is evident that many of the improvements are directed to components and subcombinations which are applicable to recorders and reproducers of various types as well as to apparatus utilizing a magnetic tape as a recording medium. Accordingly, while the invention has been described in connection with the specific details of an illustrated embodiment thereof, it is understood that these details are not intended to be limitations on the invention except insofar as set forth in the accompanying claims.

What is claimed as new and desired to be secured by Letters Patent of the United States is:

1. Apparatus for moving an elongated record medium between two reels comprising a base, first reel supporting means rotatably mounted on the base, second reel supporting means rotatably mounted on the base, means individually supporting said reel supporting means so that the axes of rotation of the latter are movable to different spaced positions, driving means rotatable about a fixed axis relative to said base, and means for selectively and independently moving said first and second supporting means into engagement with said driving means to rotate a selected one of said supporting means.

2. Apparatus for moving an elongated record medium between two reels comprising a base, a pair of plates movably mounted on said base, reel supporting means rotatably mounted on each of said plates, driving means, control means for selectively moving said plates relative to said base to engage the driving means with said reel supporting means, the engagement of one of said supporting means moving the medium in a first direction and the engagement of the other of said supporting means moving the medium in an opposite direction.

3. Apparatus for moving an elongated record medium between two reels comprising a base, driving means mounted on the base, a flywheel rotatably mounted on the base and rotated by said driving means, a pinch roller and capstan type drive assembly for advancing said medium and including a capstan element connected to and driven by said flywheel, a plate movably mounted on the base, reel supporting means rotatably mounted on the plate, and control means for moving said plate relative to the base to produce rotation of said supporting means by said flywheel.

4. Apparatus for moving an elongated record medium between two reels comprising a base, driving means, a flywheel rotatably mounted on said base, a plate movably mounted on the base, reel supporting means rotatably mounted on the plate, control means for moving the plate to place the supporting means in a driving relation with the flywheel, and speed changing means including a plurality of independently movable idler wheels selectively movable into engagement with said driving means and said flywheel for rotating said reel supporting means at different speeds.

5. Apparatus for moving an elongated record medium between two reels comprising a base, driving means, a plate movably mounted on said base, reel supporting means rotatably mounted on the plate, brake means mounted on said base adjacent said supporting means, and control means for moving said plate relative to said base to produce rotation of said supporting means by said driving means in a plurality of positions of said control means, said control means also moving said supporting means into engagement with said brake means during movements to said plurality of positions of said control means.

6. Apparatus for moving an elongated record medium between a pair of reels comprising movably mounted means for supporting said reels; driving means for imparting movement to said reels; means for braking movement of said reels; and control means selectively adjustable into a plurality of different settings to produce movement of said medium in different directions and at different speeds, adjustment of said control means into said settings moving said supporting means into operative engagement with said driving means to rotate said reels in different directions and at different speeds, and movement of said control means toward or away from said settings moving said supporting means relative to said braking means whereby selective braking forces are applied to said reels during the periods that the direction and speed of rotation of said reels are being changed.

7. Apparatus for moving an elongated record medium between two reels comprising driving means rotatable about a fixed axis, pulley means driven by said driving means and rotatable about predetermined axes, a first movably mounted means for rotatably supporting one of said reels, a second movably mounted means for rotatably supporting the other of said reels, and control means for varying the positions of said first and second movably mounted means to drive said one reel from said driven pulley means and to drive said other reel from said driving means.

8. The apparatus defined by claim 7 in which the driven pulley means includes a plurality of selectively effective idlers for varying the speed at which said one reel is driven.

9. Apparatus for moving an elongated record medium between a pair of reels comprising driving means, a first movably mounted reel supporting means, a second movably mounted reel supporting means, control means for varying the positions of said first and second supporting means relative to said driving means to produce selective rotation of said reel supporting means in different positions of said control means, and selectively operable braking means effective in any of the positions of said control means for applying a braking force to said supporting means.

10. Apparatus for moving an elongated record medium between a pair of reels comprising driving means, a rotatably mounted flywheel driven by said driving means, a capstan driven by said flywheel, a pinch roller movable into engagement with said capstan, a first movably mounted reel supporting means, a second movably mounted reel supporting means, first control means movable into different positions for varying the positions of said first and second supporting means relative to said driving means and said flywheel to produce selective rotation of said reel supporting means and for moving said pinch roller into engagement with said capstan in one of said positions, and second control means effective in any of the positions of said control means for applying a braking force to said supporting means and effective in said one position to move the pinch roller out of engagement with the capstan.

11. Apparatus for moving an elongated record medium between a pair of reels comprising driving means, a first movably mounted reel supporting means, a second movably mounted reel supporting means, control means for varying the positions of said first and second supporting means relative to said driving means to produce selective rotation of said reel supporting means in different positions of said control means, a pair of levers movably mounted adjacent said supporting means, braking means on each of said levers, and selectively operable means independent of said control means for moving said levers to apply a braking force to said supporting means in the different positions of said control means.

12. Apparatus for moving an elongated record medium between two spaced reels comprising driving means, a rotatably mounted flywheel in a motion transmitting relation with one of said reels, a pivotally mounted lever, a link pivotally mounted on the lever, an idler rotatably mounted on said link, resilient means urging said idler toward said flywheel and said driving means, and control means engaging said lever for moving the idler into engagement with the driving means and the flywheel.

13. Apparatus for moving an elongated record medium between two spaced reels comprising driving means having a plurality of axially spaced driving pulleys, at least two of said pulleys having different diameters; a rotatably mounted flywheel in a motion transmitting relation with one of said reels; a plurality of pivotally mounted levers; a plurality of idlers rotably mounted on the ends of said levers; and control means engaging said levers for selectively moving said idlers into engagement with the pulleys and the flywheel thereby driving said one reel at different selected speeds, said control means having an off position in which all of the idlers are out of engagement with the pulleys and the flywheel.

14. Apparatus for moving an elongated record medium between two spaced reels comprising driving means having a plurality of axially spaced driving pulleys, at least two of said pulleys having different diameters; a rotatably mounted flywheel; a first pivotally mounted lever; a first idler rotatably mounted on said first lever; a second pivotally mounted lever; a second idler rotatably mounted on said second lever; control means engaging said first and second levers for moving a selected one of said idlers into engagement with one of said different diameter pulleys and the flywheel whereby the flywheel is selectively driven at different speeds; and rotatable means for supporting one of said reels, said supporting means being movable into a force transmitting relation with said flywheel whereby said one reel is driven at different selected speeds.

15. Apparatus for moving an elongated record medium between two reels comprising driving means, rotatable reel supporting means movable into driving engagement with said driving means, fixed brake means adjacent said supporting means, movable brake means adjacent said supporting means, first control means for moving said supporting means into engagement with said fixed and movable brake means, and second control means for moving said movable brake means into engagement with said supporting means.

16. Apparatus for moving an elongated record medium between two reels comprising driving means, rotatable reel supporting means movable into driving engagement with said driving means, fixed and movable brake means adjacent said supporting means, and control means for moving said supporting means into a plurality of different positions relative to said driving means to control the movement of said medium, said fixed and movable brake means being effective during movement to said different positions to retard movement of said medium, said movable brake means being effective to retard movement of said medium at any selected time.

17. Apparatus for moving an elongated record medium between two reels comprising driving means rotatable about a fixed axis, driven pulley means in engagement with said driving means and rotatable about predetermined axes, movably mounted rotatable supply reel supporting means, movably mounted rotatable take-up reel supporting means, first and second brake means positioned adjacent each of said reel supporting means, control means for moving said supply reel and take-up reel supporting means to a plurality of different positions in which the reels are driven by said driving means and said driven pulley means at different speeds and in different directions, said control means rendering said first and second brake means effective during movement of said first and second supporting means to said different positions, and means for operating said second brake means when the supporting means are positioned in any of said plurality of different positions.

18. Apparatus for moving an elongated record medium between two reels comprising driving means rotatable about a fixed axis, driven pulley means in engagement with said driving means and rotatable about predetermined axes, first movably mounted rotatable reel supporting means, second movably mounted rotatable reel supporting means, fixed brake means positioned adjacent each of said reel supporting means, movable brake means positioned adjacent each of said reel supporting means, control means for moving both of said supporting means to a plurality of different positions in which the reels are driven by said driving means and said driven pulley means at different speeds and in different directions, said control means moving said supporting means into engagement with said fixed and movable brake means during movement of said first and second supporting means to said different positions, and means for operating said movable brake means when the supporting means are positioned in any of said plurality of different positions.

19. Apparatus for moving an elongated record medium between a supply reel and a take-up reel comprising a base; driving means including a plurality of driving pulleys rotatable about a single fixed axis, at least two of said pulleys having different diameters; a flywheel mounted on said base for rotation about a single fixed axis; a pair of idlers; a pair of centrally pivoted levers each rotatably supporting one of said idlers at one end thereof; cam means engaging the other ends of the levers for moving a selected one of said idlers into engagement with the flywheel and one of the driving pulleys to drive the flywheel at a speed determined by the engaged driving pulley; a capstan secured to said flywheel; a pinch roller movably mounted on said base and movable into engagement with said capstan; a first plate movably mounted on the base; take-up reel supporting means rotatably mounted on said first plate; a second plate movably mounted on said base; supply reel supporting means rotatably mounted on said second plate; and cam means rotatably mounted on the base in a force transmitting relation with said first and second plates for controlling the positions thereof relative to the driving pulleys and the flywheel and in a force transmitting relation with said pinch roller for controlling the position thereof relative to the capstan.

20. Apparatus for moving an elongated record medium between a supply reel and a take-up reel comprising a base; driving means including a plurality of axially spaced driving pulleys of different diameters rotatable about a single fixed axis; a flywheel mounted on said base for rotation about a single fixed axis; speed control means including a plurality of idlers independently movable into engagement with the flywheel and one of the driving pulleys to drive the flywheel at a speed determined by the engaged driving pulley; a capstan secured to said flywheel; a pinch roller movably mounted on said base and movable into engagement with said capstan; rotatable take-up reel supporting means movably mounted on the base; rotatable supply reel supporting means movably mounted on the base; brake means mounted on said base adjacent both of said reel supporting means; and movable control means in a force transmitting relation with both of said supporting means for controlling the positions thereof relative to the brake means, the driving pulleys, and the flywheel and in a force transmitting relation with said pinch roller for controlling the position thereof relative to the capstan.

21. Apparatus for moving an elongated record medium between a supply reel and a take-up reel comprising a base; driving means including a plurality of axially spaced driving pulleys of different diameters rotatable about a single fixed axis; a flywheel mounted on said base for rotation about a single fixed axis; speed control means including a plurality of idlers each independently movable into engagement with the flywheel and one of the driving pulleys to drive the flywheel at a speed determined by the engaged driving pulley; a capstan secured to said flywheel; a pinch roller movably mounted on said base and movable into engagement with said capstan; a first plate movably mounted on the base; take-up reel supporting means rotatably mounted on said first plate; a second plate movably mounted on the base; supply reel supporting means rotatably mounted on said second plate; and cam means rotatably mounted on the base in a force transmitting relation with said first and second plates for controlling the positions thereof relative to the driving pulleys and the flywheel and in a force transmitting relation with said pinch roller for controlling the position thereof relative to the capstan.

22. Apparatus for moving an elongated record medium between a supply reel and a take-up reel comprising a base; driving means including a plurality of axially spaced driving pulleys of different diameters rotatable about a single fixed axis; a flywheel mounted on said base for rotation about a single fixed axis; speed control means including a plurality of idlers independently movable into engagement with the flywheel and one of the driving pulleys to drive the flywheel at a speed determined by the engaged driving pulley; a capstan secured to said flywheel; a pinch roller movably mounted on said base and movable into engagement with said capstan; a first plate movably mounted on the base; take-up reel supporting means rotatably mounted on said first plate; a second plate movably mounted on the base; supply reel supporting means rotatably mounted on said second plate; brake means mounted on said base adjacent both of said reel supporting means; and cam means rotatably mounted on the base in a force transmitting relation with said first and second plates for controlling the engagement of said first and second reel supporting means with said brake means, said flywheel, and said pulleys and in a force transmitting relation with said pinch roller for controlling the position thereof relative to said capstan.

23. Apparatus for moving an elongated record medium between a supply reel and a take-up reel comprising a base; driving means including three axially spaced driving pulleys rotatable about a single fixed axis; a flywheel mounted on said base for rotation about a single fixed axis; a pair of idlers; means movably mounted on the base for rotatably supporting each of said idlers; speed control means for moving a selected one of said idlers into engagement with the flywheel and one of the driving pulleys to drive the flywheel at a speed determined by the engaged driving pulley; a capstan rotatable about the axis of and secured to said flywheel; a pinch roller movably mounted on said base and movable into engagement with said capstan; a first plate movably mounted on the base; take-up reel supporting means rotatably mounted on said first plate; a second plate movably mounted on the base; supply reel supporting means rotatably mounted on said second plate; brake means mounted on said base adjacent both of said reel supporting means; and control means rotatably mounted on the base in a force transmitting relation with said first and second plates and said pinch roller for controlling the positions thereof, said control means having four positions, in a first position of which the first and second plates are moved relative to the base so that the supply and the take-up reel supporting means engage the brake means, in a second position of which the first plate is moved relative to the base to place the take-up reel supporting means in a force transmitting relationship with said flywheel and the pinch roller is moved into engagement with the capstan, in a third position of which the first plate is moved to place the take-up reel in a force transmitting relationship with said flywheel, and in a fourth position of which the second plate is moved relative to the base to place the supply reel supporting means in a force transmitting relation with one of said driving pulleys.

24. Transducing apparatus utilizing an elongated record medium movable between a supply reel and a take-up reel comprising a base; driving means rotatable about a single fixed axis; a flywheel mounted on said base for rotation about a single fixed axis and in a force transmitting relation with said driving means; a capstan secured to said flywheel; a first linkage movably mounted on the base; a pinch roller rotatably mounted on the linkage for movement into engagement with the capstan; rotatable take-up reel supporting means movably mounted on the base; rotatable supply reel supporting means movably mounted on the base; transducing means positioned adjacent said medium; switching means for conditioning said transducing means for recording and reproducing operations, said switching means normally being conditioned for reproducing operations; a second linkage movably mounted on the base for holding said switching means in a position to condition the transducing means for recording operations; and control means rotatably mounted on the base for selectively shifting the supporting means into engagement with the driving means and the flywheel, and in engagement with said first and second linkages for controlling the positions of said pinch roller and said switching means.

25. Transducing apparatus utilizing an elongated record medium movable between a supply reel and a take-up reel comprising a base; driving means rotatable about a single fixed axis, a flywheel mounted on said base for rotation about a single fixed axis and in a force transmitting relation with said driving means; a capstan rotatable about the axis of and secured to said flywheel; a first linkage movably mounted on the base; a pinch roller rotatably mounted on the linkage for movement into engagement with the capstan; a first plate movably mounted on the base; take-up reel supporting means rotatably mounted on the first plate; a second plate movably mounted on the base; supply reel supporting means rotatably mounted on said second plate; brake means mounted on said base adjacent both of said reel supporting means; transducing means positioned adjacent said medium; switching means for conditioning said transducing means for recording and reproducing operations, said switching means normally being conditioned for reproducing operations; a second linkage movably mounted on the base for holding said switching means in a position to condition the transducing means for recording operations; and control means rotatably mounted on the base and engaging said first and second linkages and said first and second plates, said control means being rotatable to a forward position and a stop position, movement of said control means into the forward position moving said first linkage to place the pinch roller in engagement with the capstan, moving said second linkage to a position for holding said switching means in a recording position, and moving said first plate to place said take-up reel supporting means in a force transmitting relation with said flywheel, movement of said control means into the stop position moving said first linkage to move the pinch roller out of engagement with the capstan, and moving said first and second plates to place the supporting means for the take-up reel and the supply reel in engagement with said brake means.

26. Transducing apparatus utilizing an elongated record medium movable between a supply reel and a take-up reel comprising a base; driving means including first and second axially spaced driving pulleys rotatable about a single fixed axis; a flywheel mounted on said base for rotation about a single fixed axis and in a force transmitting relation with said first driving pulley; a capstan rotatable about the axis of and secured to said flywheel; a first linkage movably mounted on the base; a pinch roller rotatably mounted on the linkage for movement into engagement with the capstan; a first plate movably mounted on the base; take-up reel supporting means rotatably mounted on the first plate; a second plate movably mounted on the base; supply reel supporting means rotatably mounted on said second plate; brake means mounted on said base adjacent both of said reel supporting means; transducing means positioned adjacent said medium; switching means for conditioning said transducing means for recording and reproducing operations, said switching means normally being conditioned for reproducing operations; a second linkage movably mounted on the base for holding said switching means in a position to condition the transducing means for recording operations; and control means rotatably mounted on the base and engaging said first and second linkages and said first and second plates, said control means being rotatable to a forward position and a rewind position, movement of said control means to the forward position moving said first linkage to place the pinch roller in engagement with the capstan, moving said second linkage to a position for holding said switching means in a recording position, and moving said first plate to place said take-up reel supporting means in a force transmitting relation with said flywheel, movement of said control means into the rewind position from said forward position moving said first linkage to move the pinch roller out of engagement with the capstan, moving said second linkage to release said switching means, moving said first and second plates to place the supporting means for the take-up reel and supply reel in momentary engagement with said brake means, and then moving said supply reel supporting means into engagement with said second driving pulley.

27. In an elongated record medium driving apparatus, the combination including a control member, a pinch roller rotatably mounted on the control member, main control means including resilient means connected to said control member and movable to an operative position in which said control member is moved to place the pinch roller in engagement with the medium, and auxiliary control means engaging said control member for moving said control member relative to said main control means and against the action of said resilient means to move said control member relative to said main control means to move said pinch roller away from said medium without displacing said main control means from said operative position.

28. In an elongated record medium driving apparatus the combination including a control member; a pinch roller rotatably mounted on the control member; main control means; resilient means secured to said control member and said main control means; means for moving said main control means to an operative position to move said control member so that said resilient means biases the pinch roller in engagement with said medium; and auxiliary control means for moving said control member relative to said main control means against the action of said resilient means to move said pinch roller away from said medium without displacing said main control means from said operative position, release of said auxiliary control means permitting said resilient means to move said pinch roller into engagement with said medium.

References Cited in the file of this patent

UNITED STATES PATENTS

| | | |
|---|---|---|
| 2,241,013 | Gay | May 6, 1941 |
| 2,262,731 | Gruber et al. | Nov. 11, 1941 |
| 2,365,691 | Fodor | Dec. 26, 1944 |
| 2,538,893 | Begun | Jan. 23, 1951 |
| 2,645,495 | Nelson | July 14, 1953 |
| 2,668,674 | Roberts | Feb. 9, 1954 |
| 2,686,637 | Dashiell | Aug. 17, 1954 |
| 2,717,282 | Reed | Sept. 6, 1955 |